United States Patent
Nakamura et al.

(10) Patent No.: US 7,132,464 B2
(45) Date of Patent: Nov. 7, 2006

(54) INK FOR INK-JET RECORDING AND IMAGE FORMING METHOD

(75) Inventors: Masaki Nakamura, Akiruno (JP); Hidetaka Ninomiya, Mitaka (JP); Atsushi Tomotake, Hino (JP)

(73) Assignee: Konica Corporation, Tokyo (JP)

( * ) Notice: Subject to any disclaimer, the term of this patent is extended or adjusted under 35 U.S.C. 154(b) by 149 days.

(21) Appl. No.: 10/367,144

(22) Filed: Feb. 14, 2003

(65) Prior Publication Data

US 2003/0158291 A1   Aug. 21, 2003

(30) Foreign Application Priority Data

Feb. 20, 2002   (JP)   .............................. 2002-043136

(51) Int. Cl.
*C09D 11/10* (2006.01)
*C08K 9/10* (2006.01)

(52) U.S. Cl. ........................ 523/160; 523/201; 523/206

(58) Field of Classification Search ................ 523/160, 523/161, 201, 206; 106/31.27, 31.57, 31.6, 106/31.85
See application file for complete search history.

(56) References Cited

U.S. PATENT DOCUMENTS

| | | | |
|---|---|---|---|
| 5,942,560 A | | 8/1999 | Idogawa et al. |
| 5,955,515 A | * | 9/1999 | Kimura et al. ............... 523/161 |
| 5,965,634 A | * | 10/1999 | Idogawa et al. ............ 523/161 |
| 6,777,463 B1 | * | 8/2004 | Ando et al. ................. 523/160 |
| 2002/0156154 A1 | * | 10/2002 | Ando et al. ................. 523/160 |
| 2003/0008942 A1 | * | 1/2003 | Ninomiya et al. .......... 523/160 |
| 2003/0050362 A1 | * | 3/2003 | Sakai et al. ................. 523/160 |
| 2003/0149131 A1 | * | 8/2003 | Ninomiya et al. .......... 523/160 |

FOREIGN PATENT DOCUMENTS

| | | |
|---|---|---|
| EP | 0761782 | 3/1997 |
| JP | 5518418 | 2/1980 |
| JP | 55139471 | 10/1980 |
| JP | 5845272 | 3/1983 |
| JP | 3250069 | 11/1991 |
| JP | 8 92513 | 4/1996 |
| JP | 8183920 | 7/1996 |
| JP | 8253720 | 10/1996 |
| JP | 011347 | 1/2001 |

OTHER PUBLICATIONS

Billmeyer Jr., Fred W.; Textbook of Polymer Science 3$^{rd}$ Edition, John Wiley & Sons, New York, 1984 (pp. 152-153).*
English translation of Japanese Abstracts.
One page each of English Translation of Japanese Abstracts.
European Search Report EP 03 00 3147.
One page Patent Abstracts of Japan, Publication #2001181528, Publication date: Jul. 3, 2001 (English Abstract).
One page of English Abstract only of Patent Abstracts of Japan, Publication #08253720, Publication date: Oct. 1, 1996.
One page of English Abstract only of Patent Abstracts of Japan, Publication #08183920, Publication date: Jul. 16, 1996.
One page of English Abstract only of Patent Abstracts of Japan, Publication #08092513, Publication date: Apr. 9, 1996.

* cited by examiner

*Primary Examiner*—Callie Shosho
(74) *Attorney, Agent, or Firm*—Lucas & Mercanti, LLP

(57) ABSTRACT

An ink-jet recording ink is disclosed. The ink contains colored particles each composed for Resin A containing a colorant, or colored particles each comprising a core composed of Resin A containing a colorant and a shell composed of Resin B covering the core, a water miscible solvent and water, and absorption coefficient "a" of the ink as itself and absorption coefficient "b" of the ink in which the colorant is dissolved satisfy the relation of $0.50 \leq a/b \leq 0.95$.

9 Claims, No Drawings

INK FOR INK-JET RECORDING AND IMAGE FORMING METHOD

FIELD OF THE INVENTION

The invention relates to an ink-jet recording ink and an image forming method, in detail, an ink-jet recording ink improved in the glossiness of the recorded image, the anti-spreading ability of the image and the anti-peeling off ability of the image and an image forming method.

BACKGROUND OF THE INVENTION

In the ink-jet recording, micro droplets of an ink are filed by various driving principles to record images and characters. The ink-jet recording method has merits such as that the high speed, low noise and multi-color recording can be easily attained.

The ink-jet recording using a dye ink is spread accompanied with nearing the image quality to that of silver salt photograph and the lowering of the price according to the recent progress of the technology.

The dye is soluble in a solvent, and the dye molecular forms color in a state of a molecular or a cluster. Accordingly, the absorption spectrum is sharp and the color is highly pure and clear since the surroundings of the molecules are similar with each other. The ink-jet image with high transparent feeling and clear hue can be obtained by the dye ink since granular pattern caused by the presence of particles is not formed and scattered or reflected light is not occurred. Moreover such the ink has a high reliability with respect to that the blocking of the printer is difficultly occurred. Thus the dye ink has been most commonly used.

On the other hand, the dye ink has a drawback such as that the color fastness is low because the reducing of the number of the molecules directly reflects to the color density when the molecule is decomposed by a reaction such as photochemical reaction. The image recorded by the ink-jet using the dye ink is unavoidably limited in the use and degraded in the quality since the ink is an aqueous solution of a dye and easily spread on the recording medium even though high image quality can be obtained. The dye ink further has a problem that the dye ink is permeable into the recording medium so that high density difficultly can be obtained compared with an ink using a pigment.

The pigment ink, in which the pigment having high light fastness is used as the colorant, is applied for the use requiring an image with high fastness. However, the pigment ink is inferior in the color reproducibility to the dye ink since the pigment exists in a state of pigment particles. Therefore, the pigment more easily scatters light compared with the dye and gives the image with low transparent feeling.

As the means for solving the above-mentioned problems of the aqueous ink using the water-soluble dye, addition of fine resin particles such as emulsion and latex has been investigated. Japanese Patent Publication Open to Public Inspection, hereinafter referred to as JP O.P.I. Publication, No. 55-18418 describes a proposal relating to a recording medium for ink-jet recording in which latex defined as "a kind of colloid liquid formed by dispersing a component such as rubber and resin by a emulsifying agent in a state of fine particle in water". An amount of latex two times or more of the mount of the dye is necessary to improvement of the light fastness and the spread prevention by the addition of the latex such as that proposed in the publication. Consequently, the stability of the dispersion and the release of the ink are difficultly held and the image equal to that by the silver salt photography in the granularity and the glossiness cannot be obtained yet.

Inks for ink-jet recording containing aqueous dispersion of resin colored by an oil-soluble dye or a hydrophobic dye are proposed for solving the problems of low image density and the low light fastness of the aqueous ink using the water-soluble dye. For example, JP O.P.I. Publication Nos. 55-139471, 58-45272, 3-250069, 8-253720, 8-92513, 8-183920 and 2001-11347 each proposes an ink using emulsion polymerized polymer or dispersed polymer particle each dyed by the oil-soluble dye. In such the ink using the colored fine particles, the effects of the ink is reduced when the dye is at the surface or outside of the particle. Moreover, problems of the reducing of the image glossiness, increasing of image spreading and lowering of the adhesiveness between the recording medium and the image formed thereon are newly found when the recorded image is stored for a long period under high humidity.

As the method for raising the penetration speed of the ink into the ink-jet recording medium and improving the anti-spreading ability and the glossiness, it has been known to use a solvent capable of lowering the dynamic surface tension of the ink such as triethylene glycol monobutyl ether. However, in the aqueous ink containing the colored particle which is comprised of colorant included in the resin, the solvent such as triethylene glycol monobutyl ether is penetrated into the resin constituting the colored fine particle so as to solve out the colorant included in the resin to the aqueous medium of the ink. Therefore, lowering of the image density, blocking of the ink-jet head, adhering of the recording medium surface, lowering of the penetration speed of the ink into the recording medium, overflowing of the ink and occurring of unevenness of the image are caused. Accordingly, the using amount of the solvent capable of lowering the surface dynamic tension of the ink is inevitably limited.

As above-mentioned, the aqueous ink containing the colored fine particle using the oil-soluble dye or the pigment has various problems and is required to further improvement even though it has latent possibility of solving the problems of the usual aqueous ink using the water-soluble dye or the pigment dispersion.

SUMMARY OF THE INVENTION

The invention is investigated based on the foregoing problems. The object of the invention is to provide an ink-jet recording ink and an image forming method improved in the glossiness, the anti-spreading ability and the anti-peeling off ability of the printed image.

The invention and the preferable embodiment are described.

An ink-jet recording ink comprises colored particles each composed of Resin A containing a colorant, or colored particles each comprising a core composed of Resin A containing a colorant and a shell composed of Resin B covering the core, a water-miscible solvent and water. And the ink satisfies formula of $$0.50 \leq a/b \leq 0.95$$

in which a is absorption coefficient of the ink, and b is absorption coefficient of the ink measured after the colorant is dissolved.

In the ink it is preferable that difference of p and q is from 1 nm to 30 nm, wherein p is wavelength width in nm of the ink at absorbance of 0.8 when the absorbance at the $\lambda_{max}$ in spectrum within the range of from UV to visible light is set at 1.0, and q is wavelength width in nm of the ink measured after the colorant is dissolved at an absorbance of 0.8 when the absorbance at the $\lambda_{max}$ is set at 1.0.

The absolute value of difference between solubility parameter of Resin A and solubility parameter of the colorant is from $0.1(J/cm^3)^{1/2}$ to $3.0(J/cm^3)^{1/2}$ in the ink.

The colorant fine particles preferably have core/shell structure comprising a core composed of Resin A containing a colorant and a shell composed of Resin B covering the core.

The volume average particle diameter of the colored particles is preferably from 10 to 200 nm.

The surface tension of the ink is preferably 25 mN/m to 50 mN/m.

The pH value of the ink is preferably from 6.0 to 11.0.

At least one of the water-miscible solvent is preferably a poly-valent alcohol ether or a poly-valent alcohol.

The content of the water-miscible solvent is preferably from 10% by weight to 60% by weight.

An image forming method comprising, releasing the ink described above as a liquid droplet to adhere to an ink-jet recording medium according to a digital signal.

DETAILED DESCRIPTION OF THE INVENTION

The inventor have been investigate for the improvement of the glossiness, the anti-spreading ability of image and the adhesive of the ink image under high humidity when the image is formed by the ink-jet recording ink containing a colored particle constituted by Resin A containing the colorant or the colored particle constituted by Resin A containing a colorant and Resin B covering the surface of Resin A containing the colorant.

As the results of the investigation it is found that the object of the invention can be attained by that the absorption coefficient "a" of the ink and the absorption coefficient "b" of the ink measured after the colorant is dissolved satisfy the relation of $0.50 \leq a/b \leq 0.95$.

The foregoing effects can be enhanced by that the difference of the wavelength width p in nm of the ink at an absorbance of 0.8 when the absorbance at the $\lambda_{max}$ in spectrum within the range of from UV to visible light is set at 1.0, and the wavelength width q in nm of the ink measured after the colorant is dissolved at an absorbance of 0.8 when the absorbance at the $\lambda_{max}$ in spectrum within the range of from UV to visible light is set at 1.0, is made to a value within the range of from 1 nm to 30 nm.

Further it is preferable that the absolute value of the difference of the solubility parameter of Resin A and the solubility parameter of the colorant is made to within the range of from $0.1(J/cm^3)^{1/2}$ to $3.0(J/cm^3)^{1/2}$.

The colorant fine particle is preferably made one having a core/shell structure constituted by Resin A containing the colorant and Resin B covering the surface of Resin A.

It is supposed that the dye is dispersed into the molecule state in high concentration in the resin so that the apparent Tg of the resin is raised or the high concentration dye molecule accelerate the volatilization of the remained solvent even though the technical mechanism of the improvement by the constitution of the invention is not cleared in detail.

The effects of the invention are further enhanced by that the volume average particle diameter of the colored particles is made to within the range from 10 to 200 nm; at least one of the water-miscible solvent is a poly-valent alcohol ether of a poly-valent alcohol and the surface tension, pH value and the amount of the water-miscible solvent of the ink-jet recording ink are controlled within the specified range. Thus the invention is attained. The colored particles may be referred to colored fine particles hereafter.

The ink-jet recording ink comprises a colored fine particle constituted by Resin A containing a colorant or a colored fine particle constituted by Resin A containing a colorant and resin B covering the surface of Resin A containing the colorant. The ink satisfy the relation of $0.50 \leq a/b \leq 0.95$, preferably $0.60 \leq a/b \leq 0.92$, and more preferably $0.72 \leq a/b \leq 0.90$, in which a is the absorption coefficient of the ink itself and b is the absorption coefficient of the ink measured after the colorant in the colored particle is dissolved.

The ink sample is diluted by a poor solvent for the colorant, and the absorption coefficient and the absorption spectrum are measured to obtain a and p. On the other hand the colorant in the colored particles is dissolved by a suitable solvent, diluted by a poor solvent, and the absorption spectrum are measured to obtain b and q. The poor solvent for the colorant is a solvent by which the colorant is not dissolved from the colored particles, and a good solvent for the colorant is that by which the colorant is dissolved from the colored particles. Therefore the solvents depend on the species of colorant. When the colorant which is dissolved in ethylacetate is employed, the poor solvent is water, methanol, ethanol, etc., and the good solvent is ethylacetate, methylethyl ketone, etc. When the colorant which is dissolved in methanol is employed, the poor solvent is ethylacetate, methylethyl ketone, etc., and the good solvent is methanol, ethanol, etc.

The absorption coefficient and the absorption spectrum are measured by a spectrophotometer available in the market such as spectrophotometer UVIDFC-610 manufactured by Shimadzu Seisakusho Co., Ltd., and automatic spectrophotometer HITACHI U-3000/3300, manufactured by Hitachi Co., Ltd.

The difference of the wavelength width p in nm of the ink containing the colorant contained in the colored fine particle at an absorbance of 0.8 when the absorbance at the $\lambda_{max}$ in spectrum within the range of from UV to visible light is set at 1.0, and the wavelength width q in nm of the ink in which the colorant is dissolved at an absorbance of 0.8 when the absorbance at the $\lambda_{max}$ in spectrum within the range of from UV to visible light is set at 1.0, is preferably within the range of from 1 nm to 30 nm, more preferably from 2 nm to 20 nm, further preferably from 3 nm to 15 nm. The width of the wavelength p (nm) and q (nm) at the absorbance 0.8 can also be determined by the foregoing method.

Practically, 1 gram of the ink is diluted by a solvent which does not dissolve the colorant or the resin, such as methanol; and the spectral absorption curve of the solution in the region of UV to visible light is measured. The absorption coefficient "a" per gram of the ink is calculated from the measurement result at the $\lambda_{max}$ and the wavelength width "p" (nm) at an absorbance of 0.8 when the absorbance at the $\lambda_{max}$ of the spectral absorption curve is compensated at 1.0.

To 1 g of the ink, a solvent which dissolves the colorant, such as ethyl acetate, is added; and the colorant is dissolved using an ultrasonic dispersing apparatus and diluted by a solvent which does not dissolve the colorant or the resin, such as methanol. The absorption coefficient per gram of the ink "b" is calculated from the measurement result and the wavelength width "q" (nm) at an absorbance of 0.8 when the absorbance at the $\lambda_{max}$ of the spectral absorption curve is compensated at 1.0.

Various methods can be utilized for attaining the characteristics, for example, the condition can be attained by suitably selecting the factors such as the kind of resin (the kind of monomer, weight average of molecular weight and SP value), the condition for core/shell formation and the kind of colorant.

The absolute value of the difference between the solubility parameter of Resin A and the solubility parameter of the colorant is preferably within the range of from $0.1(J/cm^3)^{1/2}$ to $3.0(J/cm^3)^{1/2}$, more preferably from $0.1(J/cm^3)^{1/2}$ to $2.0(J/cm^3)^{1/2}$.

The solubility parameter in the invention can be obtained according to the Hildebrandt's solubility parameter which is frequently used for determining the easiness of dissolving of a nonelectrolyte substance in an organic solvent. Regarding the solubility parameter, J. H. Hildebrand, J. M. Prausnitz & R. L. Scott, "Regular and Related Solutions", van Nostrand-Reinhold, Princeton, 1970, and "Polymer Data Handbook, Fundamentals", Society of Polymer Science of Japan, can be referred. The solubility parameter values of various kinds of solvent are described in A. F. Barton, "Handbook of Solubility Parameters and Other Cohesive parameters", CRC Press, Boca Raton/Fla., 1983, and "Polymer Data Handbook, Fundamentals", Society of Polymer Science.

The parameter of substance is defined by $$SP=(\delta E/V)^{1/2}$$

in which $\delta E$ is the cohesive energy per mole and V is the volume per mole.

The solubility parameter can be obtained by the solubility. Moreover, the parameter can be obtained by various methods such as a latent evaporation heat method, a vapor pressure method, a swelling method, a surface tension method, a thermal expansion coefficient method and a refractive index method.

The solubility parameter is determined by the following method and represented by the unit of $(J/cm^3)^{1/2}$.

The solubility parameter hereinafter referred to as the SP value, of a substance can be determined by the solubility of the substance in various kinds of solvent each having a known SP value. The parameter determination method according to the solubility in the solvent is effective when the structure of the sample such as a dye is unknown.

The SP value of Resin A or the colorant to be used as the core according to the invention is determined by the dissolution method in which the solubility of the sample in the various kinds of solvent each having the known SP value such as ethanol, acetone, methyl ethyl ketone, ethyl acetate and toluene is determined and the SP value of the sample is determined from the graph in which the SP value of the solvent and the solubility of the sample in one mole of the solvent are each plotted on X-axis and Y-axis, respectively.

Resins employed in the invention (referred to polymer of the invention) are described.

Resin A mainly includes the colorant and contributes to maintain the fastness and the tone of the colorant. Resin B raises the stability of the dispersion of the fine particle including the colorant and contributes the improving of the image quality by inhibiting the coagulation of the colorant on the recording medium. Resin B also contributes to maintain the fastness and the tone of the colorant.

Various polymers may be employed for the resin A. The particularly preferred polymers include polymers having an acetal group as a major functional group, polymers having a carbonic acid ester, polymers having a hydroxyl group, and those having an ester group. Said polymers may have a substituent which may be comprised of a straight chain, a branched chain, or a cyclic structure. Various types of said polymers having a functional group are commercially available, but may be synthesized using conventional methods. Further, copolymers of these may be obtained as follows. For example, an epoxy group is introduced into one polymer molecule, and subsequently, the resultant polymer undergoes condensation polymerization with other polymers. Said polymers may also be obtained by carrying out graft polymerization utilizing light as well as radioactive rays.

Listed as polymers having acetal as a major group are polyvinyl butyral resins, which include, for example, #2000-L, #3000-1, #3000-2, #3000-4, #3000-K, #4000-1, #4000-2, 5000-A, #6000-C, and #6000-EP, all manufactured by Denki Kagaku Kogyo Kabushiki Kaisha, and BL-1, BL-1H, BL-2, BL-2H, BL-5, BL-10, BL-S, BL-SH, BX-10, BX-L, BM-1, BM-2, BM-5, BM-S, BM-SH, BH-3, BH-6, BH-S, BX-1, BX-3, BX-5, KS-10, KS-1, KS-3, and KS-5, all manufactured by Sekisui Chemical Co., Ltd.

Said polyvinyl butyral resins are obtained as derivatives of PVA (polyvinyl alcohol). The acetylation ratio of hydroxyl group of original PVA is, at maximum, approximately 80 mol percent, and is commonly from about 50 to 80 mol percent. Incidentally, acetal, as described herein, does not refer to a 1,1-diethoxyethane group under its narrow definition, but refers to common orthoaldehyde compounds. With reference to the hydroxy group, the polymer composing the shell part, which is the outermost, comprises monomer containing hydroxy group in an amount of preferably 5 to 50 mol %, and more preferably 10 to 30 mol %. The content of the acetyl group is preferably 10 mol % or less. The polymer containing acetal as a major functional group is a polymer in which at least 30 mol % of oxygen contained in the polymer forms acetal group.

Employed as other polymers containing acetal as a major functional group may be the Iupital Series, manufactured by Mitsubishi Engineering-Plastics Corporation.

Listed as polymers having carbonic acid esters as a major functional group are polycarbonate resins, which includes, for example, the Iupilon Series and the NOVAREX Series, both being manufactured by Mitsubishi Engineering-Plastics Corporation., Ltd. Said Iupilon Series is manufactured employing Bisphenol A as a raw material and those having various molecular weight may be employed, even though said molecular weight may differ depending upon its determination method. Said NOVAREX Series may be employed which has a molecular weight of 20,000 to 30,000 and a glass transition point of approximately 150° C. However, said NOVAREX Series is not limited to those having said molecular weight.

The polymers having a carbonic acid ester as a major functional group, as described herein, refer to those in which at least 30 mol percent of oxygen atoms incorporated in said polymers contribute to the formation of said carbonic acid ester.

Listed as polymers having a hydroxyl group as a major functional group are PVAs. Many PVAs exhibit low solubility in organic solvents, while PVAs having a low saponification value exhibit higher solubility. PVAs having high water solubility may be employed in such a manner that they are added to a water phase and after removing organic solvents, are adsorbed onto suspended polymers.

Employed as PVAs may be commercially available products which include, for example, Kuraray POVAL PVA-102, PVA-117, PVA-CSA, PVA-617, and PVA-505, and in addition, special brand PVAs as a sizing agent, and heat fusion molding PVAs. Employed as other functional polymers may be KL-506, C-118, R-1130, M-205, MP-203, HL-12E, and SK-5102. The degree of saponification is generally at least 50 mol percept. On the other hand, it is also possible to employ those having a degree of saponification of approximately 40 mol percent such as LM-10HD. It is further possible to employ those having a hydroxyl group which are not included in common PVA. It is still further possible to employ those in which at least 20 mol percent of oxygen atoms included in polymers form a hydroxyl group.

Listed as polymers having an ester group as a major functional group are, for example, methacrylic resins. It is possible to employ 560F, 60N, 80N, LP-1, SR8500, and SR6500 of the Delpet Series, manufactured by Asahi Kasei Co., Ltd. The polymers having an ester group as a major functional group, as described herein, refer to those in which at least 30 mol percent of oxygen atoms incorporated in said polymers form said ester group.

Styrene resin and acryl series resin may be employed preferably in the invention. The resins includes those polymers obtained by a method such as radical polymerization, cationic polymerization and anionic polymerization, from monomers such as styrene, acrylic acid, methacrylic acid, methylmethacrylate, ethylacrylate, butylacrylate, isobutylacrylate, hexylacrylate, 2-hydroxyethylacrylate, 2-ethylhexylacrylate, methylmethacrylate, ethylmethacrylate, butylmethacrylate, isobutylmethacrylate, hexylmethacrylate, 2-hydroxyethylmethacrylate, and 2-ethylhexylmethacrylate.

These polymers may be employed individually or in combination. Further, when at least 50 percent by weight of said polymers are incorporated, other polymers, as well as inorganic fillers, may be incorporated.

Copolymers of these polymers may preferably be employed. Such copolymers may be prepared employing the following method. For example, polymers having a hydroxyl group are copolymerized with various polymers in such a manner that said hydroxyl group is allowed to react with monomers such as glycidyl methacrylate having an epoxy group, and subsequently, the resultant product undergoes copolymerization with methacrylic acid ester monomers, employing suspension polymerization.

As Resin B, a polymer having a hydrophobic portion and a hydrophilic portion may be used. In concrete, a combination of a hydrophobic monomer and a hydrophilic monomer is preferred. The hydrophobic monomer is selected from the group consisting of ethylene, propylene, butadiene, vinyl chloride, vinylidene chloride, vinyl acetate, styrene, (meth)acrylate, and aryl (meth)acrylate; and the hydrophilic monomer is selected from the group consisting of a monomer having a hydroxyl group such as hydroxy ethyl (meth)acrylate and polyethylene glycol mono(meth)acrylate, a monomer having a carboxyl group such as (meth)acrylic acid, itaconic acid and maleic acid, a monomer having a sulfonic group such as styrenesulfonic acid and sulfobutyl (meth)acrylate and a monomer having am amido group.

A combination of a styrene/acrylate type hydrophobic monomer such as an alkyl (meth)acrylate and an allyl(meth)acrylate, and a monomer selected from styrene/(meth)acrylate type hydrophilic monomers such as hydroxyethyl(meth)acrylate, polyethylene glycol mono(meth)acrylate, (meth) acrylic acid, sulfobutyl(meth)acrylate and acrylamide, is preferable since such the polymer is easily produced.

In the fine colored particle-containing water-based ink of the present invention, the polymers employed in said fine colored particles are preferably blended with said ink at a ratio of 0.5 to 50 percent by weight and more preferably at a ratio of 0.5 to 30 percent by weight. When the blended amount of said polymers is less than 0.5 percent by weight, the protection properties of the coloring material are not sufficient. On the other hand, when said blended amount exceeds 50 percent by weight, the storage stability as suspension ink is degraded and printer head clogging occasionally occurs due to the increase in viscosity as well as coagulation of the suspension at the nozzles tips. As a result, said blended amount is preferably adjusted to the range described above.

Next, the water-miscible solvent relating to the invention is described below.

The content of the water-soluble is preferably from 10% to 60%, more preferably 20% to 50%, by weight.

The compounds represented by the following Formula I are preferably used as the water-miscible solvent to be used in the invention.

$$A-B \qquad \text{Formula I}$$

In the above formula, A is a group containing a hydrophilic substituent and B is a hydrophobic group.

The group represented by A is a group containing a hydrophilic substituent such as a hydroxyl group, a carboxyl group, a sulfoxide group, a sulfone group, a sulfonic acid group and 2-keto-1-pyrrolidinyl group. Among them, hydroxyl group is preferred.

B is a hydrophobic group which is preferably an aliphatic group or an aromatic group each having 3 to 10 carbon atoms. The aliphatic group having 4 to 8 carbon atoms is preferred.

The compounds represented by Formula I each have a structure analogous to a usual surfactant. The usual surfactant is forms a micelle in an aqueous solution at a low concentration.

The compounds represented by Formula I each preferably have no ability for forming the micelle. When the compound has the micelle forming ability, the viscosity of the ink is considerably raised when the concentration of the compound is over 1% since the interaction between the molecules is strong.

A water-miscible organic solvent is preferred as the water-miscible solvent usable in the invention. Concrete example of the solvent include an alcohol such as methanol, ethanol, propanol, iso-propanol, butanol, iso-butanol, sec-butanol, tert-butanol, pentanol, hexanol, cyclohexanol and benzyl alcohol; a poly-valent alcohol such as ethylene glycol, diethylene glycol, triethylene glycol, polyethylene glycol, propylene glycol, dipropylene glycol, polypropylene glycol, butylenes glycol, hexanediol, pentane diol, glycerol, hexanetriol and thioglycol; a poly-valent alcohol ether such as ethylene glycol monomethyl ether, ethylene glycol monoethyl ether, ethylene glycol monobutyl ether, ethylene glycol monophenyl ether, diethylene glycol monomethyl ether, diethylene glycol monoethyl ether, diethylene glycol monobutyl ether, diethylene glycol dimethyl ether, propylene glycol monomethyl ether, ethylene glycol monomethyl ether acetate, triethylene glycol monomethyl ether, triethylene glycol monoethyl ether, triethylene glycol monobutyl ether, triethylene glycol dimethyl ether, dipropylene glycol monopropyl ether and tripropylene glycol dimethyl ether; an amine such as ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine and tetramethylpropylenediamine; an amide such as formamide, N,N-dimethylformamide and N,N-dimethylacetoamide; a heterocyclic compound such as 2-pyrrolidone, N-methylpyrrolidone, N-cyclohexyl-2-pyrrolidone, 2-oxazolidone and 1,3-dimethyl-2-imidazolidinone; a sulfoxide such as dimethylsulfoxide; a sulfone such as sulfolane; a sulfonate such as sodium 1-butanesulfonate; urea; acetonitrile and acetone. At least one kind of the water-miscible solvent is preferably the poly-valent alcohol ether or the poly-valent alcohol. Ethylene glycol monobutyl ether or butyl cellosolve, diethylene glycol monobutyl ether, triethylene glycol monobutyl ether and ethylene glycol monophenyl ether are preferred as the preferable poly-valent alcohol ether, and 1,2-hexanediol and 1,2-pentanediol are preferred as the poly-valent alcohol. Triethylene glycol monobutyl ether and 1,2-hexanediol are particularly preferred.

The colored fine particle relating to the invention is described in detail below.

The colored fine particle relating to the invention can be prepared by various methods. For example, the following methods can be applied: a method in which an oil-soluble colorant is dissolved in an monomer and emulsified in water and the monomer is polymerized to form a polymer including the colorant; a method in which a polymer and a colorant are dissolved in an organic solvent and the solution is emulsified in water and then the solvent is removed; and a method in which a porous fine particle of polymer is added to a solution of a colorant so that the colorant is adsorbed and immersed in the polymer particle. Furthermore, a method for forming a shell covering the colored particle by polymer can be applied.

The following methods can be applied for providing the polymer shell: a method in which a dispersion of water-soluble polymer is added to an aqueous suspension of the core so that the polymer is adsorbed on the core; a method in which monomer is gradually dropped into the core suspension so that the polymer is deposited onto the core accompanied with the polymerization of the monomer and a method in which polymer dissolved in an organic solvent and gradually dropped into the suspension of the core so that the polymer is adsorbed onto the core accompanied with the separation of the polymer. Furthermore, a method for forming the core/shell structure on one step is considerable. Examples of such the method include a method in which the polymer to be the core and the polymer to be the shell are together heated and dissolved and suspended in water and polymerized; and a method in which the foregoing liquid is gradually dropped into water containing a micelle of surfactant so as to be emulsion polymerized. Moreover, a method can be also applied in which the colorant is dissolved or dispersed in the monomer capable forming the core and the monomer capable of forming the shell and the monomers are polymerized by a suspension polymerization or emulsion polymerization.

The colored fine particle according to the invention either may be one without shell or one with shell. However, it is preferred that the colored fine particle have the core/shell structure constituted by Resin A containing the colorant and Resin B covering Resin A. In such the case, the amount of the polymer of the shell is preferably from 5% to 95% of the whole amount of polymer. When the amount of the polymer is less than 5%, the thickness of the shell is insufficient and a part of the core containing much colorant is easily exposed. When the amount of the shell is excessive, the amount of the polymer of the shell is relatively decreased so that the colorant protect function of the shell tends to be lowered. The amount of the shell is more preferably from 10% to 90% by weight.

The amount of the colorant is preferably from 20% to 1,000% by weight. The density of the printed image is made to insufficient when the amount of the colorant is too lower; and the sufficient protective effect of the polymer cannot be obtained when the ratio of the colorant is too high.

Evaluation of Core/Shell Formation Status

In the invention, it is important to evaluate that the particle is actually have core/shell structure or not. In the invention, the method for analysis is limited from the viewpoint of the resolution ability since the diameter of the individual particle is very small as not more than 150 nm. As the analysis method suitable for such the purpose, a transmission electron microscope (TEM) and a time of flight type secondary ion mass spectrometry apparatus (TOF-SIMS) can be applied. When the colored fine particle having the core/shell structure is observed by TEM, the particle can be observed by coating and drying the suspension on a carbon-supporting layer. It is necessary to dye the colored fine particle for evaluate the formation status of the core/shell structure since the observed image by the TEM is usually monochromatic. The colored particle constituted by only core is dyed and observed by the TEM, and then compared with the particle with the shell. Furthermore, the fine particles with shell and those without shell are mixed, dyed and subjected to observation by the TEM. Then it is confirmed that the ratio of the particles different from each other in the degree of the dying accords with the ratio of the particle with shell to that without shell. It is confirmed by the TOF-SIMS that the dye near the surface of the particle is reduced by the presence of shell compared with the particle of core only. When an element which is not contained in the polymer is contained in the colorant, the presence of the shell containing small amount of the colorant can be confirmed by utilizing the element as the probe. When such the element is not contained, the colorant content in the shell can be compared with that in the particle having no shell by the use of suitable dying agent. The core/shell structure can be more clearly observed by the method in which the core/shell particle is embedded in epoxy resin, and sliced by a microtome to make an ultra thin slice, and the slice is dyed. An element capable of being a probe is contained in the polymer of the dye, the composition of the core and shell and the distribution of the dye in the core and the shell can be estimated by the TEM.

The volume average particle diameter of the colored fine particles is preferably from 10 to 200 nm, more preferably from 20 to 120 nm, particularly preferably from 20 to 100 nm. The effects of the invention are enhanced by making the volume average particle diameter of the particles to the value specified by the invention.

The volume average particle diameter can be measured by a particle diameter measuring apparatus available in the market according to a light scattering method, an electrophoresis method and a laser trap method, for example, laser refraction particle diameter measuring apparatus SLAD 1100, manufactured by Shimadzu Corp., particle diameter measuring apparatus Horiba LA-920, manufactured by Horiba Seisakusho Co., Ltd., and Zetasizer 1000, manufactured by Malvern Co., Ltd.

The colorant usable in the invention is described below.

Various kinds of dye or pigment can be used as the colorant incorporated in the polymer. In the invention, the use of the dye is preferred as the colorant. An oil-soluble dye, a dispersion dye, an acid dye and a basic dye can be used; and the oil-soluble dye is preferably used.

Hue of the colorant in the present invention is commonly yellow, magenta, cyan, black, blue, green and red, and is preferably yellow, magenta, cyan and black. An oil dye is generally a dye which is soluble in organic solvents and insoluble in water. It does not have a water-soluble group such as carboxyl or sulfonyl group. It further includes an intrinsically water-soluble dye that becomes oil-soluble after salt formation with a long chain alkyl base. For example, known is a salt forming dye which is produced from an acid dye, a direct dye or a reactive dye and a long chain alkyl amine.

Specifically preferable examples of the oil dyes include the following:

Orient Chemical Industries, Ltd.: Valifast Yellow 4120, Valifast Yellow 3150, Valifast Yellow 3108, Valifast Yellow 2310N, Valifast Yellow 1101, Valifast Red 3320, Valifast Red 3304, Valifast Red 1306, Valifast Blue 2610, Valifast Blue 2606, Valifast Blue 1603, Oil Yellow GG-S, Oil Yellow 3G, Oil Yellow 129, Oil Yellow 107, Oil Yellow 105, Oil Scarlet 308, Oil Red RR, Oil Red OG, Oil Red 5B, Oil Pink 312, Oil Blue BOS, Oil Blue 613, Oil Blue 2N, Oil Black BY, Oil Black BS, Oil Black 860, Oil Black 5970, Oil Black 5906, and Oil Black 5905.

NIPPON KAYAKU CO., LTD.: Kayaset Yellow SF-G, Kayaset Yellow K-CL, Kayaset Yellow GN, Kayaset Yellow A-G, Kayaset Yellow 2G, Kayaset Red SF-4G, Kayaset Red K-BL, Kayaset Red A-BR, Kayaset Magenta 312, and Kayaset Blue K-FL.

ARIMOTO CHEMICAL CO., LTD.: FS Yellow 1015, FS Magenta 1404, FS Cyan 1522, FS Blue 1504, C.I. Solvent Yellow 88, Solvent Yellow 83, Solvent Yellow 82, Solvent Yellow 79, Solvent Yellow 56, Solvent Yellow 29, Solvent Yellow 19, Solvent Yellow 16, Solvent Yellow 14, Solvent Yellow 04, Solvent Yellow 03, Solvent Yellow 02, Solvent Yellow 01; C.I. Solvent Red 84:1, C.I. Solvent Red 84, C.I. Solvent Red 218, C.I. Solvent Red 132, C.I. Solvent Red 73, C.I. Solvent Red 72, C.I. Solvent Red 51, C.I. Solvent Red 43, C.I. Solvent Red 27, C.I. Solvent Red 24, Solvent Red 18, Solvent Red 01; C.I. Solvent Blue 70, Solvent Blue 67, Solvent Blue 44, Solvent Blue 40, Solvent Blue 35, Solvent Blue 11, Solvent Blue 02, Solvent Blue 01; Solvent Black 43, C.I. Solvent Black 70, C.I. Solvent Black 34, C.I. Solvent Black 29, C.I. Solvent Black 27, C.I. Solvent Black 22, C.I. Solvent Black 7, C.I. Solvent Black 3; C.I. Solvent Violet 3, C.I. Solvent Green 3 and C.I. Solvent Green 7.

Further, metal complex dyes such as described in JP-A 9-277693, 10-20559 and 10-30061 are also preferably employed. For example, dyes represented by Formula (II) are preferable.

$$M(Dye)_l (A)_m \qquad \text{Formula (II)}$$

In Formula (II), M represents a metal ion, (Dye) represents a dye capable of forming a coordination bond with a metal ion, and (A) represents a ligand except a dye. "l" represents 1, 2 or 3, and "m" represents 1, 1, 2 or 3. When "m" is 0 (zero), "l" represents 2 or 3, and in this case, (Dye) may be same or different.

The metal ions represented by M are ions of metals selected from Al, Co, Cr, Cu, Fe, Mn, Mo, Ni, Sn, Ti, Pt, Pd, Zr and Zn. Ions of Ni, CU, Cr, Co, Zn, and Fe are preferable in terms of color tone and various kinds of durability, and Ni ion is specifically preferable.

Dyes represented by (Dye) and capable of forming a coordination bond with a metal ion include dyes having various dye structures, and preferably are dyes containing a coordination group in a structure of conjugated methine dye, azo methine dye and azo dye.

A disperse dye can be used as an oil dye, and disperse dyes are not limited by the following, however, specifically preferable examples are shown below. Specifically preferable examples include dyes such as C.I. Disperse Yellow 5, 42, 54, 64, 79, 82, 83, 93, 99, 100, 119, 122, 124, 126, 160, 184:1, 186, 198, 199, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9.

Dyes represented by Formula 1, 2 or 3 are also preferably usable.

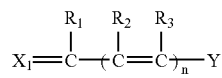

Formula 1

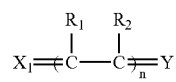

Formula 2

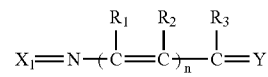

Formula 3

In Formulas 1 through 3, $X_1$ is a coupler residue used in silver halide color photographic material. Examples of the residue include a derivative of acetanilide, 5-pyrazoline, imidazole, pyrazolopyrrole, pyrazoloimidazole, pyrazolotriazole, pyrazolotetrazole, pyrazolopyrimidine-7-one, barbituric acid, thiobarbituric acid, rhodanine, hydantoin, thiohydantoin, oxazoline, iso-oxazolone, indandione, pyrazolidinedione, oxazolinedione, hydroxypyridone, cyclohexadienone, phenol or naphthol. n is 0, 1 or 2.

Y is an aromatic carbon-cyclic group or a heterocyclic group each having 5 or 6 member. Y is preferably a derivative of benzene, pyridine, thiazole, oxazole, furan or thiophene.

$R_1$, $R_2$ and $R_3$ are each a hydrogen atom, a halogen atom or a mono-valent substituent such as an alkyl group, a cycloalkyl group, an aralkyl group, an aryl group, an alkoxyl group, an aryloxyl group, an acylamino group, a sulfonamide group, a ureido group, an alkoxycarbonylamino group, an alkylthio group, arylthio group, an alkoxycarbonyl group, a carbonyl group, a sulfamoyl group, a sulfonyl group and an amino group.

Among the dyes represented by the foregoing formulas, those represented by Formula 1 is preferable and those in which n is 0 is particularly preferred.

The colorant is preferably blended at 1 to 30 weight % in the ink, and more preferably at 1.5 to 25 weight %. When the blend content of a colorant is less than 1 weight % print density is insufficient. When it is over 30 weight %, aging stability may be reduced due to increase of the particle diameter caused by, for example, coagulation. Therefore, the foregoing range is preferred.

An ink of the present invention, utilizing water as a medium, comprises a polymer suspension incorporating the foregoing colorant, and various kinds of conventional additives, well known in the art. Examples of the additives that may be contained in the suspension are; a wetting agent such as polyalcohols, a dispersant, an antifoaming agent such as a silicone type, an anti-mold agent such as chloromethyl phenol, and/or a chelating agent such as EDTA, or an oxygen absorbing agent such as a sulfite salt type.

Further, the foregoing dispersant is not specifically limited, however, the HLB value thereof is preferably from 8 to 18 in order to obtain the effect as a dispersant and being effective to control the increase of particle diameter in a suspension.

As a dispersant, commercial products are also usable. Such commercial products include, for example, Dispersant SNB, MS, N, SSL, ST and P (names of the products) manufactured by Kao Corp.

The blended content of a dispersant is not specifically limited, however, it is preferably from 0.01 to 10 weight % in the water-based ink of the present invention. When the blended content of the compound is less than 0.01 weight %, it is difficult to achieve small particle diameter suspensions, and when it is over 10 weight %, the particle diameter of the suspension may increase or stability of the suspension may be lowered causing the possibility of the suspension to gel. Therefore, preferred is the foregoing range.

Further, as the foregoing antifoaming agent, there is no specific limitation and numerous commercially available products are acceptable. Such commercially available products include, for example, KF 96, 66, 69, KS 68, 604, 607A, 602, 603, KM73, 73A, 73E, 72, 72A, 72C, 72F, 82F, 70, 71, 75, 80, 83A, 85, 89, 90, 68-1F and 68-2F (names of the products) manufactured by Shin-Etsu Silicone Co., Ltd. The blending content of these compounds is not specifically limited, however, is preferably from 0.001 to 2 weight % in the water-based ink of the present invention. When an content of the compound is less than 0.001 weight %, it easily causes foaming at the time of ink preparation, and it is difficult to eliminate small bubbles in the ink, while when it is over 2 weight %, although foaming may be restrained, print quality may be deteriorated by generation of repellency spots or non uniform printing. Therefore, the foregoing range is preferred.

Next, a preparation method of an ink of the present invention will be explained.

Ink of the present invention can be prepared by various kinds of emulsifying methods.

Volume average particle diameter of the colored particles is preferably from 10 to 200 nm. The volume average diameter can be obtained, for example, by optionally selecting or combining the kind or amount of the dispersing agent, or emulsifying methods mentioned later.

The examples are summarized, for example, on p. 86 of "Progress and Application of Functional Emulsifiers and Emulsifying Techniques" published by C. M. C. Co., Publishing Ltd. In the present invention, specifically preferably used are emulsifying dispersion apparatuses utilizing ultrasonic waves, high speed rotational shear or high pressure.

In emulsifying dispersion by means of ultrasonic waves, used can be two types, a so-called a batch type and a continuous type. A batch type is suitable for preparation of a relatively small amount of samples and a continuous type for preparation of a large amount of samples. In a continuous type, for example, an apparatus such as UH-600SR (produced by S. M. T. Co., Ltd.) can be used. In case of such a continuous type, the irradiation time of ultrasonic waves can be determined by (volume of dispersion room)/(flow speed× circulation number). When plural ultrasonic wave irradiation apparatuses are present, it can be determined by totaling each irradiation time. The irradiation time is practically not longer than 10,000 seconds. Further, if more than 10,000 seconds are required, load on the process is too great and emulsifying dispersion time has to be shortened in practice by such means as reselecting emulsifiers. For this reason, more than 10,000 seconds is not desired. It is preferably between 10 to 2,000 seconds.

As an emulsifying dispersion apparatus employing high speed rotational shear, dispermixers such as described on pages 255 and 256 of, "Progress and Application of Functional Emulsifiers and Emulsifying Techniques" published by C. M. C. Publishing Co., Ltd., homomixers such as described on page 251 and ultra-mixers such as described on page 256 can be used. These types of apparatuses can be selectively employed depending on the viscosity of the solution at emulsifying dispersion. In the emulsifying dispersion apparatuses employing high speed rotational shear, the rotational number of stirring blades is important. In the case of an apparatus having a stator, since the clearance between the stirring blade and the stator is generally approximately 0.5 mm and can not be made much less, the shear stress is mainly dependent on the circumferential speed of the stirring blade. Those having a circumferential speed of 5 to 150 m/sec can be applicable in emulsifying dispersion of the present invention. When the circumferential speed is too slow, the particle diameter often cannot be made sufficiently small even with prolonged emulsification time, while the motor power has to be extremely strengthened to achieve 150 m/sec. Preferable is a range of 20 to 100 m/sec.

In emulsifying dispersion by means of high pressure, an apparatus such as LAB2000 (produced by S. M. T. Co., Ltd.) can be used, and the emulsifying dispersion ability is dependent on the pressure applied to the sample. The pressure is preferably in the range of $10^4$ kPa to $5\times10^5$ kPa. Further, the desired particle diameter can be obtained, if necessary, by repeating emulsifying dispersion a few times. When the pressure is too low, the desired particle diameter often cannot be obtained, while it is not practical to increase the pressure to $5\times10^5$ kPa because of excess load on the apparatus. More preferable is a range of $5\times10^4$ kPa to $2\times10^5$ kPa.

These emulsifying dispersion apparatus can be utilized alone, as well as in combinations if necessary. A colloidal mill or a flow-jet mixer alone cannot achieve the object of the present invention, however, the combination with an apparatus of the present invention can enhance the effect of the present invention by enabling emulsifying dispersion over a short of time.

Further, it is possible to produce the ink of the present invention utilizing phase inversion emulsification, instead of employing said devices. The phase inversion emulsification is comprised of the following processes. The aforesaid polymers are dissolved in organic solvents such as esters and ketones, along with the aforesaid dyes. If desired, carboxyl groups in said polymers are ionized by the addition of neutralizers. After adding water, said organic solvents are removed so as to result in water-based phase inversion.

After finishing phase inversion, the resultant system is heated under reduced pressure so as to remove said ester and ketone based solvents as well as the specified amount of water, whereby the fine colored particle-containing water-based ink of the present invention, which has the desired concentration, is prepared.

Another preferable embodiment of the ink-jet ink according to the invention is described.

The surface tension of the ink-jet recording ink is preferably from 25 mN/m to 50 mN/m, more preferably from 30 mN/m to 40 mN/m. The surface tension of the ink-jet recording ink according to the invention is preferably controlled by using a surfactant and the kind and the amount of thereof is suitably selected.

The pH value of the ink-jet recording ink is preferably from 6.0 to 11.0, more preferably from 8.0 to 10.0. Examples of the pH controlling agent usable in the ink-jet recording ink according to the invention include an organic amine such as monoethanolamine, diethanolamine and triethanolamine; an inorganic alkaline agent such as a hydroxide of alkaline metal, for example, sodium hydroxide, lithium hydroxide and potassium hydroxide; an organic acid and an inorganic acid.

One or more kinds of an anionic surfactant, a nonionic surfactant and a cationic surfactant may be used in the ink-jet recording ink according to the invention. Example of the surfactant usable in the invention include the anionic surfactant such as a dialkylsulfosuccinate, an alkylnaphthalenesulfonate and a fatty acid salt; the nonionic surfactant such as a polyoxyethylene alkyl ether, a polyoxyethylene alkylallyl ether, an acetylene glycol, a polyoxyethylene-polyoxypropylene block copolymer; and the cationic surfactant such as an alkylamine salt and a quaternary ammonium salt, even though the usable surfactant is not limited to the above-mentioned. The anionic surfactant and the nonionic surfactant are preferred.

In the invention, a polymer surfactant is also usable. Examples of the polymer surfactant include a styrene/acrylic acid/alkyl acrylate copolymer, a styrene/acrylic acid copolymer, a styrene/maleic acid/alkyl acrylate copolymer, a styrene/maleic acid copolymer, a styrene/methacrylic acid/alkyl acrylate copolymer, a styrene/methacrylic acid copolymer, a styrene/maleic acid half ester copolymer, a vinylnaphthalene/acrylic acid copolymer and a vinylnaphthalene/maleic acid copolymer.

The ink-jet recording ink according to the invention may contain a water-soluble polymer or a dispersion of water-insoluble polymer.

A preferable example of the water-soluble polymer is a natural polymer. Examples of the natural water-soluble polymer include a protein such as glue, gelatin, casein and albumin; a natural gum such as gum arabic and tragacanth gum; a glucoside such as saponin; an alginic acid derivative such as alginic acid, propylene glycol alginate, triethanolamine alginate and ammonium alginate; and a cellulose derivative such as methyl cellulose, carboxymethyl cellulose, hydroxyethyl cellulose and ethylhydroxyl cellulose.

Moreover, a synthesized polymer is also preferably usable as the water-soluble polymer. Examples of the synthesized polymer include an acryl resin such as a polyvinyl alcohol, a polyvinylpyrrolidone, a polyacrylic acid, an acrylic acid/acrylonitrile copolymer, a vinyl acetate/acrylate copolymer and acrylic acid/acrylate copolymer; a styrene/acrylic resin such as a styrene/acrylic acid copolymer, a styrene/methacrylic acid copolymer, a styrene/methacrylic acid/acrylate copolymer, a styrene/α-methylstyrene/acrylic acid copolymer and a styrene/α-methylstyrene/acrylic acid/acrylate copolymer; and a vinyl acetate copolymer such as a styrene/maleic acid, a styrene/α-methylstyrene/acrylic acid copolymer, a styrene/maleic anhydride styrene/α-methylstyrene/acrylic acid copolymer, a vinylnaphthalene/acrylic acid copolymer, a vinylnaphthalene/maleic acid copolymer, a vinyl acetate/ethylene copolymer, a vinyl acetate/vinylethylene fatty acid ester copolymer, a vinyl acetate/maleate copolymer, a vinyl acetate/crotonic acid copolymer, and a vinyl acetate/acrylic acid copolymer and a salt thereof. Among them, polyvinylpyrrolidone is particularly preferable example.

The molecular weight of the water-soluble polymer is preferably from 1,000 to 200,000, more preferably from 3,000 to 20,000. When the molecular weight is less than 1,000, the effect to inhibit the growing and coagulation of the colored fine particle, and when the molecular weight exceeds 200,000, problems such as viscosity rising and insufficient dissolution tend to be occurred.

The adding amount of the water-soluble polymer is preferably from 10% to 1,000%, more preferably from 50% to 200%, by weight of the amount of the dye. When the molecular weight is less than 10% by weigh, the effect to inhibit the growing and coagulation of the colored fine particle, and when the molecular weight exceeds 1,000% by weight, problems such as viscosity rising and insufficient dissolution tend to be occurred.

The water-insoluble-polymer dispersion (referred to latex hereafter) employed for the invention is not particularly restricted. Examples of the latexes include styrene-butadiene copolymers, polystyrene, acrylonitrile-butadiene copolymers, acrylic acid ester copolymers, polyurethane, silicone-acryl copolymers, acryl modified fluorine-containing resins, and the like. The latexes may be those in which polymer particles are dispersed in a dispersion medium in the presence or absence of an emulsifying agent. As an emulsifying agent, a surface-active agent is generally used, and a polymer having a water solubilizing group such as a sulfonic acid group or a carboxylic acid group (for example, a graft polymer having a water solubilizing group in the side chain or a polymer obtained by polymerizing a monomer having a water solubilizing group and a water insoluble monomer) is preferably used.

The ink of the present invention preferably contains soap free latexes. The soap free latexes herein referred to mean latexes which are prepared without employing emulsifying agents or latexes are prepared by using a polymer having a water solubilizing group such as a sulfonic acid group or a carboxylic acid group (for example, a graft polymer having a water solubilizing group in the side chain or a polymer obtained by polymerizing a monomer having a water solubilizing group and a water insoluble monomer) as an emulsifying agent.

Recently, other than latexes in which the whole of the latex polymer particles is uniform, there are core-shell type latexes in which the latex polymer particles have the difference in composition between the central portion and the peripheral portion in the polymer particles. In the invention, this type of latex also can be preferably used.

The average particle size of the latex polymer particles used in the ink of the present invention is preferably from 10 to 300 nm, and more preferably from 10 to 100 nm. When the average diameter of the latex polymer particles exceeds 300 nm, glossiness of images recorded tends to be degraded, and when the average particle size is less than 10 nm, water resistance or abrasion resistance may be degraded. It is possible to determine the particle size of the latex polymer particles, employing commercially available particle size measurement apparatus utilizing a light scattering method, an electrophoretic method, a laser Doppler method, and the like.

The latexes are added to the ink of the invention to give its solid content of from 0.1 to 20% by weight, and preferably 0.5 to 10% by weight based on the total weight of the ink. When the content ratio is less than 0.1 percent by weight, it is difficult to achieve sufficient effects regarding water resistance. In contrast, when the content ratio exceeds 20 percent by weight, there occur problems in that the viscosity of the ink tends to increases and the particle size of pigment particles dispersed in the ink tends to increase with an elapse of time, resulting in deterioration of storage stability of the ink.

The ink according to the invention such conventional additives may be employed optionally as viscosity adjuster, resistivity adjuster, film forming agent, UV absorber, anti-oxidant, anti-fading agent, fungicidal agent and rust preventive agent, for the purpose of improving various characteristics such as stabilizing jetting, compatibility to print head or ink cartridge, storage stability, image store ability and so on. The additives include oil particles of, such as, fluid paraffin, dioctyl phthalate, tricresyl phosphate, silicon oil etc.; a UV absorbent disclosed in Japanese Patent O.P.I. Publication Nos. 57-74193, 57-87988 and 62-261476; an anti-fading agent disclosed in Japanese Patent O.P.I. Publication Nos. 57-74192, 57-87988, 60-72785, 61-146591, 1-95091 and 3-13376; and a fluorescent brightening agent disclosed in Japanese Patent O.P.I. Publication Nos. 59-42993, 59-52689, 62-280069, 61-24271 and 4-219266.

The ink jet recording mediums used in the invention include plain paper, coated paper, a swell type ink jet recording paper sheet, in which an ink receiving layer capable of absorbing ink and swelling is provided on a paper substrate, a void type ink jet recording paper sheet, in which a porous ink receiving layer is provided on a paper substrate, and ink jet recording resin sheet in which a substrate of resin such as polyethylene terephthalate is used instead of a paper substrate. The use of the porous ink jet recording sheet is preferable and can provide the excellent performance in the invention.

As the porous recording medium, porous type ink-jet recording paper and porous type ink-jet recording film are usable. They are each a recording medium having a porous layer capable of absorbing the ink. The porous layer is formed by soft coagulum mainly constituted by a water-soluble binder and an inorganic fine particle.

Various methods have been known for forming the pores in the layer, for example, the following methods are applicable: a method in which a uniform coating liquid containing two or more kinds of polymer is coated on a substrate and the pores are formed by the phase separation of the polymers in the course of drying of the coated layer; a method in which a coating liquid containing solid particles and a hydrophilic or hydrophobic binder is coated on a substrate and dried, and thus dried ink-jet recording paper is immersed in water or a liquid containing suitable organic solvent for dissolving the solid particles to form the pores; a method in which a coating liquid containing a substance capable of foaming on the occasion of layer formation is coated on a substrate and foam is formed from the substance in the course of drying to form the pores; a method in which a coating liquid containing porous fine particles and a hydrophilic binder is substrate to form the pores in or between the porous solid particles; and a method in which a coating liquid containing a hydrophilic binder and solid particles and/or fine oil droplets in an amount of equal or more volume of the hydrophilic binder is coated on the substrate to form the pores between the solid particles. The porous layer formed by any methods gives satisfactory results when the ink according to the invention is used.

It is preferable embodiment that the ink according to the invention is released in a form of droplet from the ink-jet head according to digital signals to be adhere onto the ink-jet recording medium.

In the image forming method according to the invention, either an on-demand system or a continuous system may be used as the ink-jet head. Examples of the ink releasing method include an electromechanical conversion method such as a single cavity type, a double cavity type, a bender type, a piston type, a share mode type and a shared wall type; an electro-thermal conversion method such as a thermal ink-jet type and a bubble jet type (R); a static attract method such as an electric field control type and a slit jet type; and a discharge method such as a spark jet type. Any of the above methods can be applicable.

EXAMPLES

The invention is concretely described referring examples below.

Preparation of Colored Fine Particle Dispersion

Colored Fine Particle Dispersions 1 through 10 described in Table 1 are prepared. Examples of the preparation are shown below.

Preparation Example 1

Preparation of Colored Fine Particle Dispersion 1

Into a separable flask, 5.0 g of polyvinyl butyral BM-5, produced by Sekisui Kagaku Co., Ltd., having an average polymerization degree of 850 and a SP value of 20.0 $(J/cm^3)^{1/2}$, 5.0 g of Dye A, a chelate dye, and 50 g of ethyl acetate were charged and air in the flask was replaced by nitrogen gas. The contents of the flask was stirred so as to completely dissolve the polyvinyl butyral and Dye A. Thereafter, 100 g of an aqueous solution containing 2.0 g of sodium dodecylsulfate was dropped into the flask and stirred, and then the contents were emulsified for 300 seconds by an ultrasonic dispersing apparatus UH-150, manufactured by SMT CO., Ltd. Then ethyl acetate was removed under a reduced pressure. Thus core type colored fine particles dispersion containing the dye was obtained.

Next, as a shell forming process, air in the flask containing the foregoing dispersion was replaced by nitrogen gas, and 0.15 g of potassium persulfate was added and dissolved into the dispersion. The dispersion was heated by 70° C. by a heater and 2 g of a mixture of styrene and 2-hydroxyethyl methacrylate in a mole ratio of 4:1 was dropped spending 2 hours and reacted for 6 hours to form the shell. Then the dispersion was purified by ultrafiltration. Thus core/shell type Colored Fine Particles Dispersion 1 was obtained.

Preparation Example 2

Preparation of Colored Fine Particle Dispersion 5

Colored Fine Particle Dispersion 5 containing Dye A was prepared in the same manner as in Colored Fine Particle Dispersion 1 except that polyvinyl butyral BM-5 was replaced by styrene/butyl methacrylate copolymer P-1 having a monomer mole ratio of 70/25, a weight average molecular weight of 83,000 and a SP value of 20.6 $(J/cm^3)^{1/2}$.

Preparation Example 3

Preparation of Colored Fine Particle Dispersion 6

Core/shell type Colored Fine Particle Dispersion 6 containing Dye A was prepared in the same manner as in Colored Fine Particle Dispersion 1 except that 5.0 g of polyvinyl butyral BL-1 having an average polymerization degree of 350 and a SP value of 20.0 $(J/cm^3)^{1/2}$, 5.0 g of Dye A were dissolved by 40 g of ethyl acetate and 10 g of n-butanol in the course of the preparation of the core.

Preparation Example 4

Preparation of Colored Fine Particle Dispersion 8

Core/shell type Colored Fine Particle Dispersion 6 containing Dye A was prepared in the same manner as in Colored Fine Particle Dispersion 1 except that 5.0 g of polyvinyl butyral BL-1 having an average polymerization degree of 350 and a SP value of 20.0 $(J/cm^3)^{1/2}$, 5.0 g of Dye A were dissolved by 50 g of ethyl acetate in the course of the preparation of the core.

Preparation Example 5

Preparation of Colored Fine Particle Dispersion 9

Into a separable flask, 5.0 g of polyvinyl butyral BM-5, produced by Sekisui Kagaku Co., Ltd., having an average polymerization degree of 850 and a SP value of 20.0 $(J/cm^3)^{1/2}$, 5.0 g of Dye A (a chelate dye) and 50 g of ethyl acetate were charged and air in the flask was replaced by nitrogen gas. The contents of the flask was stirred so as to completely dissolve the polyvinyl butyral and Dye A. Thereafter, 100 g of an aqueous solution containing 2.0 g of sodium dodecylsulfate was dropped into the flask and stirred, and then the contents were emulsified for 300 seconds by an ultrasonic dispersing apparatus UH-150, manufactured by SMT CO., Ltd. Then ethyl acetate was removed under a reduced pressure. Thus core type Colored Fine Particles Dispersion 9 containing the dye was obtained.

Preparation Example 6

Preparation of Colored Fine Particle Dispersion 10

Into a separable flask, 5.0 g of polyvinyl butyral BL-1, produced by Sekisui Kagaku Co., Ltd., having an average polymerization degree of 350 and a SP value of 20.0 $(J/cm^3)^{1/2}$, 5.0 g of Dye A (a chelate dye) and 50 g of ethyl acetate were charged and air in the flask was replaced by nitrogen gas. The contents of the flask was stirred so as to completely dissolve the polyvinyl butyral and Dye A. Thereafter, 100 g of an aqueous solution containing 2.0 g of sodium dodecylsulfate was dropped into the flask and stirred, and then the contents were emulsified for 300 seconds by an ultrasonic dispersing apparatus UH-150, manufactured by SMT CO., Ltd. Then ethyl acetate was removed under reduced pressure. Thus core type Colored Fine Particles Dispersion 10 containing the dye was obtained.

Preparation of the Other Colored Fine Particle Dispersions

The colored fine particle dispersions other than the above-mentioned were similarly prepared to the above-mentioned dispersions using the colorant and the polymer for core formation each described in Table 1.

Determination of the characteristic value of the colored fine particle dispersion Determination of the solubility parameter, SP value, and the difference of the PS values For determining the solubility parameter of the polymer used for the core and Dyes A and B, ethanol, acetone, methyl ethyl ketone, ethyl acetate and toluene were used as the solvents each has known SP value and the solubility of the each of the substances to be measured in the volume of 1 mole of each of these solvents was determined. A graph was prepared in which the SP value was plotted on the X-axis and the solubility was plotted on the Y-axis. From the graphs, the absolute value of the difference between the PS value of the dye and that of the dye was calculated.

Thus obtained constitution of each of the colored fine particle dispersion is shown in Table 1.

TABLE 1

| Colored fine particle dispersion No. | Polymer of core Kind | Polymer of core SP value 1 $(J/cm^3)^{1/2}$ | Colorant Kind | Colorant SP value 2 $(J/cm^3)^{1/2}$ | SP value 1 − SP value 2 $(J/cm^3)^{1/2}$ | Polymer of shell | Structure of particle |
|---|---|---|---|---|---|---|---|
| 1 | BM-5 | 20.0 | Dye A | 19.8 | 0.2 | P-5 | Core/shell |
| 2 | BM-5 | 20.0 | Dye B | 21.4 | 1.4 | P-5 | Core/shell |
| 3 | P-2 | 21.8 | Dye B | 21.4 | 0.4 | P-5 | Core/shell |
| 4 | P-3 | 23.6 | Dye A | 19.8 | 3.8 | P-5 | Core/shell |
| 5 | P-1 | 20.6 | Dye A | 19.8 | 0.8 | P-5 | Core/shell |
| 6 | BL-1 | 20.0 | Dye A | 19.8 | 0.2 | P-5 | Core/shell |
| 7 | P-4 | 20.6 | Dye A | 19.8 | 0.8 | P-5 | Core/shell |
| 8 | BL-1 | 20.0 | Dye A | 19.8 | 0.2 | P-5 | Core/shell |
| 9 | BM-5 | 20.0 | Dye A | 19.8 | 0.2 | — | Core type |
| 10 | BL-1 | 20.0 | Dye A | 19.8 | 0.2 | — | Core type |
| 11 | P-2 | 21.8 | Dye B | 21.4 | 0.4 | — | Core type |
| 12 | BM-5 | 20.0 | Dye B | 21.4 | 1.4 | — | Core type |
| 13 | BM-5 | 20.0 | Dye A | 19.8 | 0.2 | P-6 | Core/shell |
| 14 | P-2 | 21.8 | Dye B | 21.4 | 0.4 | P-6 | Core/shell |

Dye A

A mixture of the following compounds in a ratio of 1:1

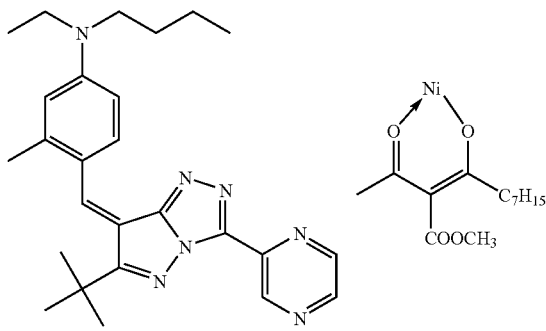

The detail of the compounds described in Table 1 in abbreviation is as follows.

Dye B: FS Yellow 1015 (Arimoto Kagaku Kogyo Co., Ltd.)

BM-5: Polyvinyl butyral (Sekisui Kagaku Co., Ltd.)

BL-1: Polyvinyl butyral (Sekisui Kagaku Co., Ltd.)

P-1: Styrene/butyl methacrylate copolymer (monomer mole ratio: 70/25, weight average molecular weight: 83,000, SP value: 20.6 $(J/cm^3)^{1/2}$)

P-2: Styrene/butyl methacrylate/2-hydroxyethyl methacrylate copolymer (monomer mole ratio: 70/20/5, weight average molecular weight: 83,000, SP value: 21.8 $(J/cm^3)^{1/2}$)

P-3: Styrene/butyl methacrylate/methyl methacrylate copolymer (monomer mole ratio: 70/10/15, weight average molecular weight: 88,000, SP value: 23.6 $(J/cm^3)^{1/2}$)

P-4: Styrene/butyl methacrylate copolymer (monomer mole ratio: 70/25, weight average molecular weight: 5,000, SP value: 20.6 $(J/cm^3)^{1/2}$)

P-5: Styrene/2-hydroxyethyl methacrylate (monomer mole ratio: 4/1)

P-6: Styrene/methacrylic acid (monomer mole ratio: 3/1)

Preparation of Ink

Inks 1 through 15 were prepared each using the above-prepared colored fine particle dispersions, respectively. For preparing the ink, purified water and Solvent 1 or Solvent 2 were added to each of the colored fine particle dispersions so that the concentration of the dye in the ink is made to 2% by weight. The pH value was controlled by an aqueous solution of sodium hydroxide and that of acetic acid and the surface tension was controlled by controlling the adding amount of Surfinol 465, produced by Nissin Kagaku Kogyo Co., Ltd., so as to make each value to the described in Table 2. Above-prepared inks were each filtered by a membrane filter to remove dust and coarse particles. Thus Inks 1 through 15 described in Table 2 were prepared.

Details of the compounds described in Table 2 are as follows.

Solvent 1: A mixture of Ethylene glycol, glycerol and triethylene glycol monobutyl ether in a ratio of 10/5/5 in weight-% to the whole weight of the ink Solvent 2: A mixture of Ethylene glycol, glycerol and 2-hexanediol in a ratio of 11/6/5 in weight-% to the whole weight of the ink Determination of Characters of Ink Determination of Absorption Coefficient and Wavelength Width at Absorbance of 0.8

Measurement of Light Absorbing Properties of Ink a and p

One gram of the ink was diluted by methanol; and the spectral absorption curve of the solution in the region of UV to visible light was measured by spectrophotometer UVIDFC-610, manufactured by Shimadzu Seisakusho Co., Ltd. The absorption coefficient "a" per gram of the ink was calculated from the measurement result at the $\lambda_{max}$ and the wavelength width "p" (nm) at an absorbance of 0.8 when the absorbance at the $\lambda_{max}$ of the spectral absorption curve is compensated at 1.0.

Measurement of Light Absorbing Properties of Colorant b and q

To 1 g of the ink, ethyl acetate, which is a good solvent for the colorant, was added; and the colorant was dissolved using an ultrasonic dispersing apparatus and diluted by methanol. The absorption coefficient of the colorant per gram of the ink "b" was calculated from the measurement result and the wavelength width "q" (nm) at an absorbance of 0.8 when the absorbance at the $\lambda_{max}$ of the spectral absorption curve is compensated at 1.0, in the same way as mentioned above.

a/b and p-q were each calculated according to thus obtained a, b, p and q.

Determination of Average Particle Diameter of the Ink

Each of the inks was diluted by 1,000 times by a 1% aqueous solution of Pelex OT-P; and the average diameter (the volume average diameter) of the colored particles was measured by a laser particle size analyzing system manufactured by OTSUKA ELECTRONICS CO., LTD.

Determination of pH and Surface Tension

The pH and the surface tension were measured according to ordinary methods.

Formation and Evaluation of Ink-Jet Image

Image Formation

Each of the above-prepared inks was charged in an ink cartridge and set in a color ink-jet printer PM-800 manufactured by Epson Co., Ltd. An image was printed out on Konica Photo Jet Paper Photolike QP glossy paper. The image was constituted by a wedge image in which the density of from 0% to 100% was separated by 16 steps of patch-like image of 3 cm×3 cm and a solid image having a density of 1.0. The printed image was stood for 3 days in the atmosphere of 60° C. and 55% RH, and subjected to the following evaluation.

Glossiness After High Humidity Treatment

The image after the high humidity treatment was visually compared with the image before the treatment and evaluated according to the following norm.

A: The glossiness of the image treated high humidity under the high humidity is not lowered at all compared with the image before the treatment.

B: The glossiness of the image treated high humidity under the high humidity is not lowered compared with the image before the treatment.

C: The glossiness of the image treated high humidity under the high humidity is lowered a little compared with the image before the treatment but the image is acceptable for practical use.

D: The glossiness of the image treated high humidity under the high humidity is considerably lowered compared with the image before the treatment and the image is unacceptable for practical use.

Evaluation of Image Spreading After High Humidity Treatment

The image after the high humidity treatment was visually compared with the image before the treatment and the C: Peeling off of the image is slightly observed at a part of the image; the degree of the peeling off is acceptable for practical use.

D: Peeling off of the image is observed on all portion of the image; the degree of the peeling off is unacceptable for practical use.

Thus obtained results are shown in Table 2.

TABLE 2

| Ink No. | Dispersion No. | Solvent of ink | Absorbancy ratio a/b | Width of difference wavelength p − q (nm) | Average particle diameter (nm) | Surface tension (mN/m) | pH | Evaluation result after high humidity treatment | | | Remarks |
|---|---|---|---|---|---|---|---|---|---|---|---|
| | | | | | | | | Glossiness | Spreading resistivity | Image peeling off resistively | |
| 1 | 1 | Solvent 1 | 0.87 | 4 | 82 | 34 | 8.8 | A | A | A | Inv. |
| 2 | 1 | Solvent 1 | 0.74 | 5 | 85 | 34 | 5.5 | C | A | B | Inv. |
| 3 | 1 | Solvent 1 | 0.78 | 5 | 80 | 34 | 11.3 | C | B | C | Inv. |
| 4 | 1 | Solvent 1 | 0.72 | 6 | 82 | 23 | 8.8 | C | B | B | Inv. |
| 5 | 1 | Solvent 1 | 0.73 | 6 | 83 | 55 | 8.8 | C | B | B | Inv. |
| 6 | 1 | Solvent 2 | 0.85 | 3 | 94 | 34 | 8.8 | A | A | A | Inv. |
| 7 | 2 | Solvent 1 | 0.67 | 16 | 72 | 34 | 8.8 | B | B | B | Inv. |
| 8 | 3 | Solvent 1 | 0.82 | 7 | 87 | 34 | 8.8 | A | A | A | Inv. |
| 9 | 4 | Solvent 1 | 0.53 | 22 | 73 | 34 | 8.8 | C | C | C | Inv. |
| 10 | 5 | Solvent 1 | 0.87 | 7 | 88 | 34 | 8.8 | A | A | A | Inv. |
| 11 | 6 | Solvent 1 | 0.78 | 5 | 93 | 34 | 8.8 | A | A | A | Inv. |
| 12 | 7 | Solvent 1 | 0.98 | 1 | 82 | 34 | 8.8 | B | D | C | Comp. |
| 13 | 8 | Solvent 1 | 0.43 | 32 | 74 | 34 | 8.8 | D | D | D | Comp. |
| 14 | 9 | Solvent 1 | 0.65 | 11 | 68 | 34 | 8.8 | B | B | B | Inv. |
| 15 | 10 | Solvent 1 | 0.38 | 35 | 72 | 34 | 8.8 | D | D | D | Comp. |
| 16 | 11 | Solvent 1 | 0.52 | 20 | 115 | 34 | 8.8 | C | C | B | Inv. |
| 17 | 12 | Solvent 1 | 0.37 | 38 | 128 | 34 | 8.8 | D | C | D | Comp. |
| 18 | 13 | Solvent 1 | 0.80 | 5 | 108 | 34 | 8.8 | A | B | A | Inv. |
| 19 | 14 | Solvent 1 | 0.78 | 7 | 110 | 34 | 8.8 | A | B | A | Inv. |

Inv.; Inventive
Comp.; Comparative spreading of the image after the treatment was evaluated according to the following norm.

A: The image spreading of the treated image is not varied at all compared with that of the image before the treatment.

B: The image spreading of the treated image is not varied compared with that of the image before the treatment.

C: The image spreading of the treated image is increased a little compared with that of the image before the treatment but the image is acceptable for practical use.

D: The treated image was considerably deformed so that the image before the treatment cannot be recognized from the treated image; the treated image is unacceptable for practical use.

Evaluation of Image Peeling Off After High Humidity Treatment

The solvent of the ink is only charged in an ink-jet cartridge and printed out on Konica Photo Jet Paper Photolike QP glossy paper by a color ink-jet printer PM-800 manufactured by Epson Co., Ltd. Then a solid image was printed by the ink. Five sheet of the image by such the procedure were piled up and stood for 3 days in the atmosphere of 60° C. and 55% RH while applying a load of 0.05 N/cm² to the surface of the piled sheets. After the standing, the piled printed images were separated from each other and the degree of the peeling off of the image was visually observed. The peeling off of the image was evaluated according to the following norm.

A: Peeling off of the image is not observed at all.
B: Peeling off of the image is not observed.

It is cleared in Table 2 that the comparative samples show the lowering of the glossiness, increasing of the image spreading and the lowering of the peeling off resistively of the image. In contrast, it can be confirmed that the samples using the ink in which the absorption coefficient "a" and the absorpotion coefficient "b" satisfy the relation of $0.50 \leq a/b \leq 0.95$, are small in the lowering of the glossiness and the increasing of the image spreading and superior in the image peeling off resistively.

The ink for ink-jet and the image forming method can be provided by the invention, which is improved in the resistivity of the lowering of glossiness, the spreading and the peeling-off of the image under the high humidity atmosphere.

The invention claimed is:

1. An ink-jet recording ink comprising
    colored particles each composed of Resin A containing a colorant, or colored particles each comprising a core composed of Resin A containing a colorant and a shell composed of Resin B covering the core,
    a water-miscible solvent and water,
    wherein the ink satisfies formula of $$0.50 \leq a/b \leq 0.95$$

wherein a is absorption coefficient of the ink, and b is absorption coefficient of the ink measured after the colorant is dissolved, and wherein an absolute value of a difference between a solubility parameter of Resin A and a solubility parameter of the colorant is from 0.1 to 2.0 $(J/cm^3)^{1/2}$.

2. The ink of claim 1, wherein the difference of p and q is from 1 nm to 30 nm, wherein p is wavelength width in nm of the ink at absorbance of 0.8 when the absorbance at the $\lambda_{max}$ in spectrum within the range of from UV to visible light is set at 1.0, and q is wavelength width in nm of the ink measured after the colorant is dissolved at an absorbance of 0.8 when the absorbance at the $\lambda_{max}$ is set at 1.0.

3. The ink of claim 1, wherein the colorant fine particles have core/shell structure comprising a core composed of Resin A containing a colorant and a shell composed of Resin B covering the core.

4. The ink of claim 1, wherein volume average particle diameter of the colored particles is from 10 to 200 nm.

5. The ink of claim 1, wherein the ink has surface tension of 25 mN/m to 50 mN/m.

6. The ink of claim 1, wherein the ink has pH value of 6.0 to 11.0.

7. The ink of claim 1, wherein at least one of the water-miscible solvent is a poly-valent alcohol ether or a poly-valent alcohol.

8. The ink of claim 1, wherein content of the water-miscible solvent is from 10% by weight to 60% weight.

9. An image forming method comprising, releasing an ink of claim 1 as a liquid droplet to adhere to an ink-jet recording medium according to a digital signal.

* * * * *